May 9, 1939.  J. VAN H. WHIPPLE  2,157,514
BRAKE TESTER OR ACCELEROMETER
Filed Nov. 16, 1935
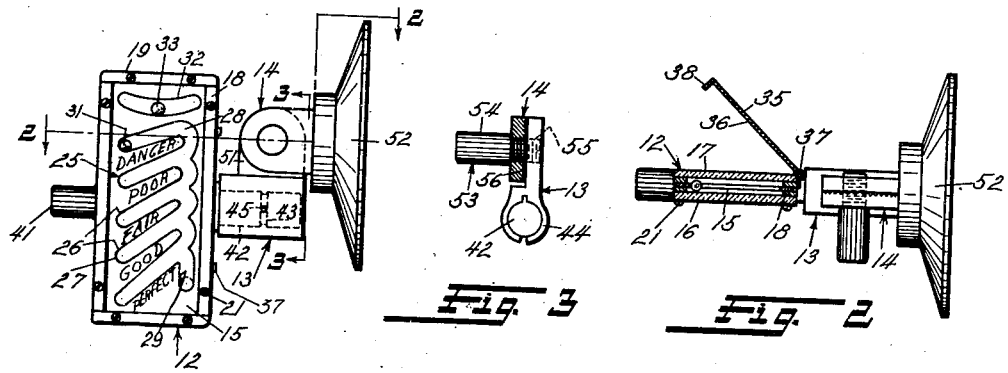
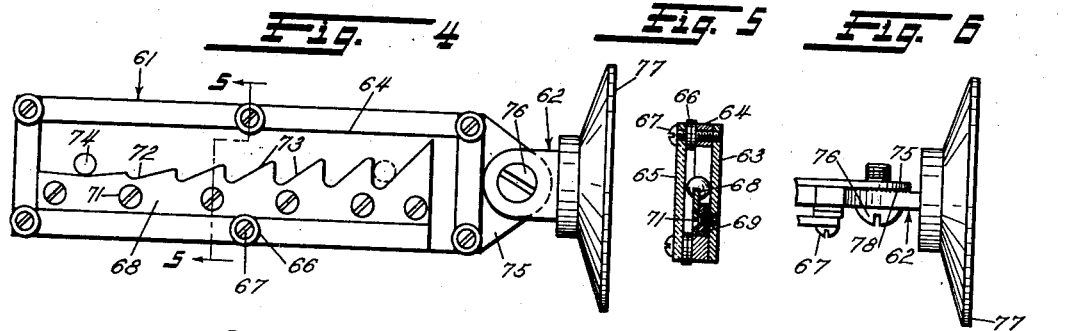
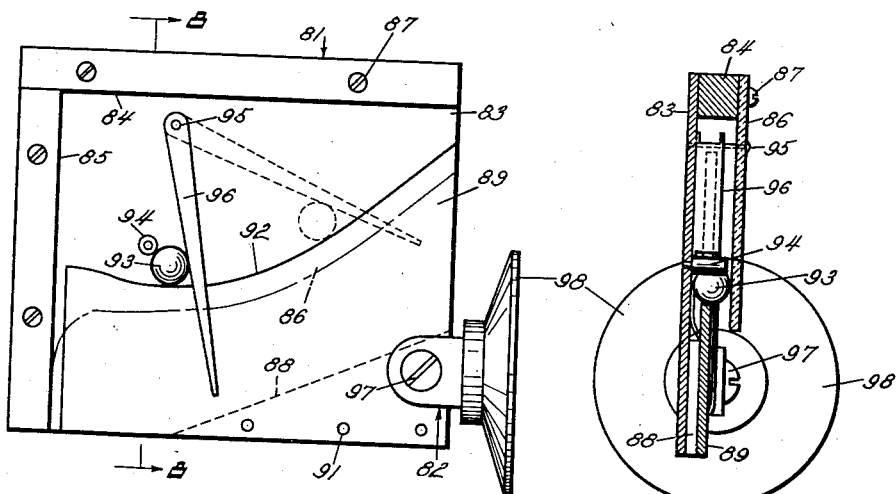
Inventor
Jack Van Horn Whipple
By Strauch & Hoffman
Attorneys Patented May 9, 1939

2,157,514

UNITED STATES PATENT OFFICE 2,157,514

BRAKE TESTER OR ACCELEROMETER

Jack Van Horn Whipple, Sellersville, Pa., assignor to United States Gauge Company, Sellersville, Pa., a corporation of Pennsylvania Application November 16, 1935, Serial No. 50,208

10 Claims. (Cl. 264—1)

This invention relates to an instrument to determine and indicate the acceleration or deceleration of a vehicle such as an automobile. More particularly, the invention is concerned with an instrument designed to test and show the effectiveness of the brakes of a vehicle by measuring the deceleration of the vehicle due to the action of the brakes, and indicating the result of said measurement in such a way as to be plainly visible to the operator of the vehicle.

The principal object of the invention is to provide a simple and compact instrument designed for ready application to a part of a vehicle for measuring and indicating the acceleration or deceleration of said vehicle, which instrument is accurate and gives a clear indication of the result of its measuring operation, but which may nevertheless be produced at a very low cost so that it may be sold cheaply.

Another object of the invention is to provide a brake tester in which use is made of a single rolling means, such as a ball, disposed for free movement in an elongated runway extending in the direction of motion of the vehicle when the tester is applied thereto.

Still another object of the invention is to provide an instrument for measuring and indicating deceleration or acceleration in which use is made of an elongated runway in which a ball freely rolls, said runway being constructed in sections disposed one above the other whereby the relatively long runway can be disposed in a casing that does not project to an objectionable degree when the casing is applied to the windshield or dash of the vehicle with the runway extending in the direction of motion of said vehicle.

A further object of the invention is to provide an indicating instrument having a reflector, in the form of a hinged cover for one side of the instrument, designed to facilitate reading of the instrument from a direction paralleling the direction of movement of the indicator of the instrument.

Still another object of the invention is to provide an instrument in which the measuring and indicating element is a single rolling means, such as a ball, and in which a leveling device is incorporated in the instrument so that the runway in which the ball moves can be readily adjusted to correct position so that the ball will give an accurate measurement and indication.

Another object of the invention is to provide an instrument to measure deceleration or acceleration, in which use is made of a single ball moving in an elongated runway to measure and indicate the change of velocity, and in which the ball is restored to its zero or starting position by a rotation of the part of the instrument in which the ball and runway are located.

Still further objects of the invention will appear as a description thereof proceeds with reference to the accompanying drawing in which:—

Figure 1 is a side elevational view of a preferred form of the invention, with one of the side plates omitted for clarity of illustration.

Figure 2 is a view taken substantially on line 2—2 of Figure 1.

Figure 3 is a fragmental view taken substantially on line 3—3 of Figure 1.

Figure 4 is a side elevational view of a modified embodiment of the invention, with the cover plate omitted for clarity of illustration.

Figure 5 is a view taken on line 5—5 of Figure 4.

Figure 6 is a fragmental view in top plan illustrating the construction for securing the tester to its supporting bracket.

Figure 7 is a side elevational view of another modified embodiment of the invention.

Figure 8 is a view taken substantially on line 8—8 of Figure 7.

With reference to Figures 1, 2 and 3 of the drawing, the preferred form of my invention is seen to consist of a casing 12 rotatably mounted within a swivel member 13 which in turn is rotatably supported upon a bracket 14 adapted to be secured to a suitable part of the vehicle being tested.

Casing 12 includes a rectangular frame plate 15 and side plates 16 and 17 coextensive with the frame and spaced therefrom by means of side and top rails 18 and 19 respectively located adjacent the edges of frame plate 15. The frame plate and rails are preferably formed of sheet metal, and the side plates are preferably formed of translucent or transparent material such as glass or the like. Rails 18 and 19 and side plates 16 and 17 are secured to frame plate 15 by means of screws 21 or the like.

Provided in frame plate 15 is an elongated runway 25 formed from a plurality of inclined sections 26 disposed one above the other and each having a closed end 27, the other ends of the sections being interconnected by means of curved passages 28 which terminate adjacent the lowest section 26 in a vertically depending pocket 29. The inclinations of the individual runway sections 26 are progressively steeper, or at a greater angle to the horizontal, from the top section to the bottom section. The sections may be straight, as illustrated, or they may be curved as may be desired. Disposed in runway 25 is a ball 31 which is adapted to freely roll along the successive inclined sections 26 and curved passages 28 from the initial position shown in full line in Figure 1 to the position in pocket 29 shown in phantom lines.

Located in frame 15 above runway 25 is an arcuate leveling channel 32 having closed ends within which a ball 33 is disposed for lateral rolling movement to indicate when casing 12 is adjusted in level position with runway 25 properly positioned for the brake testing operation which will be more fully described hereinafter.

A casing cover 35 having a mirrored reflection surface 36 is hinged to the casing at 37, the cover being illustrated in its opened or operative position in Figure 2. On the edge of cover 35 remote from hinge 37 is a detent 38 designed to snap against the edge of casing 12 when the cover is in closed position, thus serving to restrain the cover against inadvertent opening.

Projecting laterally from casing 12 at one side thereof is a knurled knob 41 which is formed integrally with frame plate 15. Projecting laterally from the other side of casing 12, and formed integrally with frame plate 15, is a stud shaft 42 which is journalled within the split sleeve 44 of swivel member 13. A suitable detent 45 is mounted in split sleeve 44 and resiliently urged into contact with a circumferential channel 43 formed on stud shaft 42 to prevent inadvertent axial displacement of the shaft with respect to the sleeve. Shaft 42 may, however, be manually withdrawn from split sleeve 44 by applying sufficient axial separating forces to the shaft and sleeve to cause detent 45 to be forced out of channel 43.

Formed integrally with sleeve 44 and extending upwardly therefrom is an apertured ear 51 which is disposed in contact with apertured bracket 14 mounted on a suction cup 52. Ear 51 and bracket 14 are mounted for relative angular adjustment upon a pin 53 which extends substantially normal to the axis of stud shaft 42. Pin 53 is provided with a knurled head 54 and a reduced shank 55 which extends freely through the aperture in bracket 14 and is threaded into the aperture in ear 51. The face of bracket 14 which contacts lug 51 is radially knurled as seen at 56 to prevent inadvertent angular slipping of the bracket when in adjusted position.

The operation of the preferred form of the invention just described takes place in the following manner:

Suction cup 52 is first secured to any suitable part of the vehicle to be tested with the runway 25 extending toward the front of the vehicle so that when the vehicle is in motion the runway will extend in the direction of such motion. In testing automobiles it has been found convenient to mount the suction on the windshield in front of the driver's seat. Pin 53 is then loosened and swivel member 13 is angularly adjusted about the pin until (with casing 12 disposed in a substantially vertical plane as seen in Figure 1) ball 33 rests in the center of leveling channel 32. Pin 53 is then tightened to lock the swivel member in position. Should ball 31 be disposed in any portion of runway 25 other than top section 26, the ball may be returned to the top section by grasping knurled knob 41 and rotating the knob, casing 12 and stud shaft 42 through an angle of 360° with respect to swivel member 13 and bringing the casing to rest in the position shown in Figure 1. During such operation the ball is drawn by gravity along curved passages 28 until it becomes lodged within top runway section 26. By virtue of the fact that the axes of pin 53 and stud shaft 42 are at right angles with respect to each other, it will be seen that a universal adjustment of casing 12 may be made with respect to bracket 14.

Casing cover 35 is next opened substantially into the position shown in Figure 2 until the mirror 36 reflects to the observer light passing through the translucent part of casing 12, and thus serves to indicate to the observer the position of ball 31 within runway 25.

With the parts of the device adjusted as described into the positions shown in the drawing, the vehicle is set in motion and accelerated to a suitable speed. In testing automobiles a speed of from thirty to forty miles per hour has been found desirable although other speeds may be used. When the testing speed has been attained, the brakes are applied to the vehicle, the force used in applying the brakes being maintained constant, at the maximum value used during normal operation of the vehicle, until the vehicle is brought to rest.

As the brakes are applied to the vehicle and deceleration thereof occurs, ball 31 is given a corresponding acceleration relative to frame plate 15 and in the direction of motion of the vehicle. If the acceleration of ball 31 is sufficiently great, the effective component of the acceleration—the component parallel to the top runway 26 upon which the ball initially rests—will cause the ball to roll up the runway against the action of gravity. Upon reaching the top of the incline the momentum which the ball has acquired will cause the ball to roll around the curved passage, which changes the direction of the momentum without substantially diminishing the magnitude thereof, and the ball will then continue rolling due to its momentum and the action of gravity down the next runway, finally coming to rest in the bottom thereof. The ball will then tend to be accelerated up the second runway in a repetition of the action just described. This action will continue until the ball finally comes to rest within a runway section 26 the slope of which is too steep to permit acceleration of the ball therealong, the action of gravity serving to retain the ball within the runway section against the influence of the effective acceleration component.

The particular runway section within which ball 31 finally comes to rest will be determined by the value of the vehicle deceleration, as will be hereinafter described, and the value of such deceleration is of course determined by the action of the brakes in stopping the vehicle. The position within the runway when ball 31 finally comes to rest is therefore a direct indication of the condition of the vehicle brakes, and the individual runway sections may be marked with legends such as Poor, Good, Perfect, etc., for directly indicating the condition of the vehicle brakes, or with other suitable indicia for indicating the value of the vehicle deceleration.

The test speed to which the vehicle is accelerated before the brakes are applied must be sufficient to give the ball 31 time to completely traverse runway 25 from the top section 26 to pocket 29 before the vehicle comes to rest, even though the ball may in fact come to rest in an intermediate position due to defective brakes.

When the vehicle is traveling at test speed before the brakes are applied, frame member 15 and ball 31 have velocities which are equal in both magnitude and direction (toward the right in Figure 1) since ball 31 is lodged in the closed end of the top runway section. Upon application of the vehicle brakes with a steady pressure, a retarding force of constant magnitude is transmitted through the vehicle and impressed upon the tester frame member 15 to effect a constant deceleration thereof.

Ball 31 due to its momentum at the time the brakes are applied, will roll along the runway 25 after the brakes are applied since its deceleration is of less magnitude than that of the frame member 15.

By means of the inclined runway, however, a component of the main retarding force is impressed upon ball 31 and decelerates the same. The magnitude of the retarding component, of a given main retarding force, which acts on ball 31 will be determined by the slope or inclination of the runway. With a given main retarding force impressed upon tester frame 15, it will therefore be seen that ball 31 will roll along the successive runway sections until it enters a section the slope of which is sufficiently great to transmit to the ball a retarding component of sufficient magnitude to bring the ball to rest.

Under the influence of a particular retarding force, therefore, ball 31 will come to rest within a particular runway section. Furthermore, since the magnitude of the retarding force is determined directly by the magnitude of the braking action of the vehicle brakes, it follows that the runway section within which ball 31 comes to rest will be determined by the braking action of the vehicle, and the final resting position of ball 31 will therefore be a direct indication of the condition of the vehicle brakes.

The position at which ball 31 finally comes to rest will be visible to the operator of the vehicle since light passing through the translucent portion of the testing device will be reflected from mirror 36 toward the vehicle operator.

Ball 31 may be returned from its position of final rest to the top runway section by grasping knob 41 and rotating the casing through an angle of 360° as previously described. The device will then be conditioned for a repetition of the test.

An alternate form of the invention is illustrated in Figures 4, 5 and 6 of the drawing, and comprises a casing 61 and a bracket 62 upon which the casing is mounted.

Casing 61 includes a base plate 63, rails 64 disposed adjacent the edges of the base plate, and a cover 65 of translucent or transparent material such as glass or the like, which is spaced from rails 64 by washers 66. The base plate, rails, washers, and glass cover plate are secured together by means of screws 67. A frame plate 68 is spaced from base plate 63 by spacing members 69, and is secured in position on the base plate by screws 71.

The upper edge of the frame plate 68 is formed to provide a runway 72 composed of a series of individual sections 73, the slope of the sections being of progressively increasing magnitude from the initial section shown at the left of Figure 4 to the final section shown at the right of Figure 4. Disposed in the casing for rolling movement along runway 72 is a ball 74.

Base plate 63, at one end thereof, is provided with an apertured ear 75. Ear 75 is adapted to receive the threaded end of an adjustment screw 76 carried by bracket 62 which is mounted on a suction cup 77. Bracket 62 is provided with a knurled face 78 for contact with ear 75 of the tester casing, and is adapted to be clamped between the ear 75 and the head of screw 76 when the screw is tightened.

In operation with the ball 74 in the position shown in Figure 4, suction cup 77 is mounted on a suitable part of the vehicle to be tested with runway 72 extending in the direction of motion of the vehicle. Casing 61 is then adjusted about screw 76 until the casing is in horizontal position. The vehicle is then accelerated to test speed and the brakes applied. Ball 74 will roll along runway 72 and finally come to rest within one of the runway sections 73, the particular section being determined by the condition of the vehicle brakes. The individual runway sections may be marked with suitable indicia as described in connection with the form of the invention shown in Figures 1, 2 and 3. Ball 74 may be returned to its initial position by removing the suction cup from the vehicle frame, inverting and tilting the casing until the ball rolls by gravity to the left of the casing, and then restoring the casing to its upright position and remounting the suction cup in the vehicle frame.

A further modification of the invention is illustrated in Figures 7 and 8, and comprises a casing 81 and a bracket 82.

Casing 81 includes a base plate 83, a top rail 84, a side rail 85 and a cover plate 86 formed of translucent or transparent material such as glass or the like. The base plate, top and side rails, and cover plate are secured together by means of screws 87. Spaced from base plate 83 by means of a spacing member 88 is frame plate 89 which is secured in assembled relation by means of rivets 91.

The top edge of frame plate 89 is formed to provide a runway 92 which becomes progressively steeper from the left to the right as seen in Figure 7. A ball 93 is disposed for rolling movement along the runway and is retained against the influence of gravity in its initial position by a pin 94 mounted on base plate 83. Mounted for rotation on a pin 95 carried by base plate 83 is a bifurcated lever 96 the parallel arms of which extend on each side of frame plate 89 and are adapted for actuation by movement of ball 93 as hereinafter described. The tips of the bifurcated lever arms are designed for light frictional contact with the frame plate.

Casing 81 is mounted upon bracket 82 by an adjustment screw 97, and bracket 82 is in turn mounted on a suction cup 98.

In operation, with ball 93 and lever 96 in the full-line position shown in Figure 7, suction cup 98 is mounted on the vehicle frame with runway 92 extending in the direction of movement of the vehicle, and casing 81 is adjusted about screw 97 until the casing is in horizontal position. The vehicle is then accelerated to test speed and the brakes applied. Ball 93 will roll along runway 92, pushing bifurcated lever 96 before it, until the ball is brought to rest upon a portion of the runway which is of sufficient inclination to prevent further rolling of the ball as shown in dotted lines. When the vehicle is brought to rest, ball 93 will roll back to its initial position against pin 94. Lever 96 will, however, remain in the position to which it was advanced by the ball, due to the light friction contact between the ends of the lever and frame plate 89. Lever 96 will therefore furnish a permanent indication of the condition of the brakes until manually returned to initial position. Such manual adjustment of the lever may be effected by virtue of the fact that the front lever bifurcation extends beyond the edge of glass cover plate 86 and is therefore readily accessible.

If desired, frame plate 89 may be marked with suitable indicia for indicating the condition of the brakes or the deceleration of the vehicle, and lever 96 in registering with such indicia will give a direct indication of the factor being tested.

Although the foregoing description of the invention has specified the particular embodiments shown in the drawing as being used to measure deceleration or braking action of a vehicle, it is to be understood that the invention equally anticipates the measuring of acceleration or vehicle "pick-up".

It will be seen from the foregoing description that the present invention provides a simple and compact instrument for measuring and indicating the deceleration (or acceleration) or the braking action (or pick-up) of a vehicle to which the device is applied.

The invention may be embodied in other specific forms without departing from the spirit or essential characteristics thereof. The present embodiments are therefore to be considered in all respects as illustrative and not restrictive, the scope of the invention being indicated by the pending claims rather than the foregoing description, and all changes which come within the meaning and range of equivalency of the claims are therefore intended to be embraced therein.

What is claimed and desired to be secured by United States Letters Patent is:

1. A brake tester or accelerometer for a vehicle comprising a frame extending in the direction of movement of said vehicle and provided with a runway consisting of a plurality of inclined sections disposed one above the other, adjacent sections being connected together by a curved passage, and a single ball disposed in said runway for movement therealong in proportion to the change in velocity of said frame.

2. A brake tester or accelerometer for a vehicle comprising a frame extending in the direction of movement of said vehicle and provided with a runway consisting of a plurality of inclined sections disposed one above the other, adjacent sections being connected together by a curved passage, rolling means disposed in said runway for movement therealong in proportion to the change in velocity of said frame, and indicia to interpret to the observer the significance of the position of said rolling means.

3. A testing instrument for a vehicle including a pivoted frame having a sectional runway extending from a starting position adjacent one end of said frame to a point adjacent the other end of said frame, rolling means constrained to move along said runway in proportion to the change in velocity of said frame and restrained against return movement along said runway, and means to swing said frame bodily about its pivot to return said rolling means to its starting position.

4. An indicating instrument for a vehicle comprising a casing having a runway and an indicator in the form of a ball disposed in said runway for movement therealong in proportion to the change in velocity of said casing and restrained against return movement along said runway, located within said casing, a bracket to support said casing, and mechanism connecting said casing and bracket comprising two pivots in right angular relation to each other, one of said pivots permitting swinging of said casing to level it and the other permitting the turning of said casing to restore said rolling means to a starting position.

5. A brake tester or the like, comprising a casing, a runway in said casing visible through at least one side thereof, said runway comprising a plurality of inclined sections disposed one above the other, said sections being closed at one end and interconnected at the other end by curved passages formed to cause a ball to roll through said sections in succession, and a single ball disposed in said runway for movement therealong in proportion to the change in velocity of said casing.

6. A brake tester or the like, comprising an adjustable casing, a leveling channel having closed ends formed in said casing, a ball shiftable within said channel to show when said casing has been adjusted to level position, a runway in said casing, said channel and runway being visible through at least one side of said casing, said runway comprising a plurality of inclined sections disposed one above the other, said sections each having a closed end and being interconnected adjacent their other ends by curved passages formed to direct a ball through the sections of the runway in succession, and a second ball disposed in said runway for movement therealong in proportion to the change in velocity of said casing.

7. A brake tester or the like, comprising a casing, rolling means disposed in a runway in said casing for movement therealong in proportion to the change in velocity of said casing, said runway being formed to present a succession of inclined surfaces over which said rolling means may freely move consecutively from a starting position in proportion to the deceleration of a vehicle, mechanism to mount said casing on a part of the vehicle including means permitting reversal of said casing to return said rolling means to its starting position and to adjust said casing to level the runway therein.

8. A brake tester or the like, comprising a casing, rolling means disposed in a runway in said casing, said runway being formed to present a succession of inclined surfaces over which said rolling means may freely move consecutively from a starting position in proportion to the deceleration of a vehicle, mechanism to mount said casing on a part of the vehicle including a bracket designed for attachment to said part, an intermediate member pivoted to said bracket for swinging movement about an axis extending transverse to said bracket, a further pivotal connection between said intermediate member and said casing permitting swinging of the casing about an axis normal to said first named axis, whereby said casing can be shifted to level it or to return said rolling means to its starting position, and mechanism to prevent movement of said casing or intermediate member about either of said axes when the casing is leveled and when said rolling means is in its starting position.

9. A brake testing instrument including a movable indicator member and a runway comprising a multiplicity of connected inclined sections each of which has a different inclination and is separated from the adjacent section by a shoulder for preventing return movement of said movable indicator member, said instrument being designed for attachment to a vehicle so that said runway extends in the direction of normal movement of said vehicle, said indicator comprising a single ball disposed in said runway to move over a number of said sections from a starting position, the extent of movement of said ball being in proportion to the deceleration of the vehicle under the influence of its brakes, and indicia opposite said sections showing the degree of effectiveness of said brakes.

10. A brake tester or accelerometer comprising a frame provided with a runway extending in the direction of movement, said runway including a plurality of connected runway sections of varying degrees of inclination relative to the horizontal, a movable member disposed in said runway for movement therealong in response to change in the velocity of said frame, and means providing tell-tale indication of the point on said runway to which said movable member advances under a given change in velocity of said frame.

JACK VAN HORN WHIPPLE.